United States Patent
Tonelli et al.

(10) Patent No.: US 9,145,471 B2
(45) Date of Patent: Sep. 29, 2015

(54) PROCESS FOR ENRICHING THE DIFUNCTIONAL CONTENT OF (PER) FLUOPOLYETHER MIXTURES

(71) Applicant: SOLVAY SPECIALTY POLYMERS ITALY S.P.A., Bollate (IT)

(72) Inventors: Claudio Adolfo Pietro Tonelli, Paderno D'adda (IT); Roberto Valsecchi, Osio Sopra (IT); Fabrizio Mutta, Fino Mornasco (IT)

(73) Assignee: SOLVAY SPECIALTY POLYMERS ITALY S.P.A., Bollate (Milano) (IT)

( * ) Notice: Subject to any disclaimer, the term of this patent is extended or adjusted under 35 U.S.C. 154(b) by 0 days.

(21) Appl. No.: 14/354,424

(22) PCT Filed: Oct. 23, 2012

(86) PCT No.: PCT/EP2012/070916
§ 371 (c)(1),
(2) Date: Apr. 25, 2014

(87) PCT Pub. No.: WO2013/060658
PCT Pub. Date: May 2, 2013

(65) Prior Publication Data
US 2014/0275635 A1    Sep. 18, 2014

(30) Foreign Application Priority Data
Oct. 28, 2011 (EP) .................................... 11187084

(51) Int. Cl.
*C08G 65/48* (2006.01)
*C08G 65/30* (2006.01)
*C08G 65/00* (2006.01)
*C08G 65/46* (2006.01)

(52) U.S. Cl.
CPC .............. *C08G 65/48* (2013.01); *C08G 65/007* (2013.01); *C08G 65/30* (2013.01); *C08G 65/46* (2013.01)

(58) Field of Classification Search
CPC ............................... C07C 43/126; C08G 65/00
USPC ....................................................... 568/677
See application file for complete search history.

(56) References Cited

U.S. PATENT DOCUMENTS

| | | |
|---|---|---|
| 4,816,159 A | 3/1989 | Khosah et al. |
| 5,246,588 A | 9/1993 | Tonelli et al. |
| 5,262,057 A | 11/1993 | Tonelli et al. |
| 6,099,937 A | 8/2000 | Gui et al. |
| 7,288,682 B2 | 10/2007 | Tchistiakov et al. |
| 2003/0100454 A1 | 5/2003 | Osawa et al. |
| 2004/0092406 A1 | 5/2004 | Osawa et al. |
| 2004/0213951 A1 | 10/2004 | Shimokawa et al. |

FOREIGN PATENT DOCUMENTS

| | | |
|---|---|---|
| EP | 822216 A2 | 2/1998 |
| JP | 2001164279 A | 6/2001 |
| JP | 2009114456 A | 5/2009 |
| WO | 2010130628 A1 | 11/2010 |

OTHER PUBLICATIONS

Schonemann, H. et al., "Tailoring performance properties of perfluoro-polyethers via supercritical fluid fractionation", Proceedings 3rd International Symposium on Supercritical fluids, Oct. 17-19, 1994, vol. 3, p. 375-380.
Kunz R.R. et al., "Transparent fluids for 157-nm immersion lithography", J. Microlithogr. Microfabrication, Microsyst., 2004, vol. 3, p. 73-83—Society of Photo-Optical Instrumentation Engineers.
Cooper A.I., "Polymer synthesis and processing using supercritical carbon dioxide", J. Mater. Chem., 2000, vol. 10, p. 207-234—The Royal Society of Chemistry.
Karis T.E. et al., "Spreading and dewetting in nanoscale lubrication", Tribology Letters, 2005, vol. 18 (1), p. 27-41—Springer Science + Business Media, Inc.
Sakane Y. et al., "Effect of Molecular Structure of PFPE Lubricant on Interaction at HDI in Near-Contact Operation", IEEE Transactions on Magnetics, 2006, vol. 42, n° 10, p. 2501-2503—IEEE.
Hirata Y., "Comparison of chromatographic behaviour of silica and chemically bonded phases in supercritical fluid chromatography", Journal of Chromatography, 1984, vol. 315, p. 31-37—Elsevier Science Publishers B.V.

*Primary Examiner* — Sikarl Witherspoon

(57) ABSTRACT

The present invention relates to a process for increasing the content of bifunctional species in mixtures of non functional, mono- and bifunctional (per)fluoropolyethers which comprises the adsorption of a (per)fluoropolyether mixture onto an adsorbing stationary phase, a first desorption step with a supercritical fluid only and a second desorption step with the supercritical fluid and a mixture of a polar solvent.

12 Claims, No Drawings

PROCESS FOR ENRICHING THE DIFUNCTIONAL CONTENT OF (PER) FLUOPOLYETHER MIXTURES

This application is a U.S. national stage entry under 35 U.S.C. §371 of International Application No. PCT/EP2012/070916 filed Oct. 23, 2012, which claims priority to European patent application No. 11187084.6, filed on Oct. 28, 2011. The entire contents of these applications are explicitly incorporated herein by this reference.

TECHNICAL FIELD

The present invention relates to a process for the purification of fluorinated polymers, in particular to a process for obtaining highly pure bifunctional (per)fluoropolyethers from (per)fluoropolyether mixtures of non functional, monofunctional and bifunctional (per)fluoropolyethers.

BACKGROUND ART

Bifunctional (per)fluoropolyethers (PFPEs) are known in the art for a number of applications, for example as lubricants, surfactants, coating agents or as macromonomers in polycondensation reactions. In all such applications it is desirable to use bifunctional PFPEs having a purity, or difunctional content, as high as possible, typically of at least 1.985. For example, in polycondensation reactions, the use PFPEs with a very high bifunctional content is necessary in order to avoid stochastic interruption of the polymer chain, which is observed when relevant amounts of monofunctional species are present.

However, bifunctional PFPEs are usually available in admixture with their non functional and monofunctional species, due to the fact that the synthetic methods currently available for manufacturing them do not allow to obtain pure bifunctional species. Therefore, subsequent purification is required in order to separate the difunctional species from the non functional or monofunctional ones, or to enrich the content of difunctional species. For this purpose, a number of purification processes have been developed. For instance, U.S. Pat. No. 5,246,588 (SOLVAY SOLEXIS S.P.A.) and U.S. Pat. No. 5,262,057 (AUSIMONT S.P.A.) disclose chromatographic processes, while U.S. Pat. No. 7,288,682 (SOLVAY SOLEXIS S.P.A.) and EP 0822216 A (AUSIMONT SPA) disclose batch or semi-batch processes: all of them envisage the use of a solid adsorbent stationary phase and an eluent usually comprising or consisting of a halogenated solvent, typically a fluorinated solvent. It is however well known that halogenated solvents have a negative environmental impact; thus, alternative, more environment-friendly methods based on the use of supercritical fluids, primarily supercritical ($scCO_2$), have been proposed. For example, SCHONEMANN, H., et al. Tailoring performance properties of perfluoro-polyethers via supercritical fluid fractionation. *Proc. 3rd. Int. Symp. on Supercritical fluids*. 17-19 Oct. 1994, vol. 3, p. 375-380. discloses a method for the separation of PFPEs mixtures wherein $scCO_2$ is used in the absence of a stationary phase. However, such a method only allows to separate the PFPE species on the basis of their solubility in the supercritical fluid; as a result, the PFPE species are separated according to their average numerical molecular weight (Mn), not according to their average functionality.

JP 2001164279 (HOYA CORP.) relates to a method for manufacturing functional fluorine-based lubricants for recording media and it teaches to separate low molecular weight and non functional fractions from functional fractions by supercritical fluid chromatography (SFC) on silica gel as stationary phase, using $scCO_2$ as mobile phase. As functional fluorine lubricants, functional PFPEs bearing end groups like piperonyl, hydroxy, ester and amino groups are mentioned. According to the description and the examples, after adsorbing a PFPE mixture on the stationary phase, elution with the supercritical fluid is accomplished by adjusting temperature and pressure. This prior art further teaches that polar or non polar co-solvents can be added to adjust the solubility of the fluorine lubricant in the supercritical fluid; however, the only example of separation therein reported, which relates to the purification of a functional PFPE mixture having piperonyl end groups (Fomblin® AM-2001 PFPE), is carried out at constant pressure and temperature, without using any polar co-solvent.

SFC is mentioned also in US 2004092406 (FUJI ELECTRIC HOLDINGS CO LTD) as a method for separating PFPE compounds having low polarity terminal groups from those containing polar terminal groups; in particular, also this document refers to the separation of a highly functionalised fraction of a PFPE having piperonyl end groups (Fomblin® AM3001 PFPE) from low-polarity fractions using $scCO_2$ at constant temperature and pressure as mobile phase and silica gel as stationary phase.

However, according to the Applicant's observations, when trying to increase the difunctional content of PFPEs mixtures, in particular of PFPE diols mixtures using $scCO_2$ only as mobile phase and silica gel as stationary phase, for example as taught in JP 2001164279 (HOYA CORP.) and US 2004092406 (FUJI ELECTRIC HOLDINGS CO LTD), considerably long elution times, which are not convenient on an industrial scale, are necessary; instead, when only $scCO_2$ in admixture with a polar solvent, namely methanol, is used as mobile phase, no separation or enrichment at all is achieved, because the PFPE mixture is not adsorbed on the stationary phase.

US 2003100454 (FUJI ELECTRIC CO) discloses a process for increasing the difunctional content in a mixture of mono- and bi-functional perfluoropolyether by extraction with $scCO_2$. This document does not suggest a process comprising a first desorption step with $scCO_2$ and a second desorption step with a mixture of $scCO_2$ and polar solvents.

U.S. Pat. No. 6,099,937 (SEAGATE TECHNOLOGY INC) discloses a PFPE lubricant, including Fomblin® lubricants, for magnetic discs having a narrow and high molecular weight. This patent teaches that the lubricant can be obtained by various fractionation techniques, including SFC, but no specific teaching is given with regard to this method.

WO 2010/130628 (SOLVAY SOLEXIS S.P.A.) relates to a process for the purification of a polyol PFPE derivative (P) containing at least one end group of formula —$CF_2CH_2OCH_2CH(OH)CH_2OCH_2CH(OH)CH_2OH$ (t3), which comprises the derivatization as ketal/acetal of a polyol PFPEs mixture containing polyol (P), submitting the derivatized mixture to chromatography on silica gel, recovering and distilling the eluate and hydrolysing the distillation residue. This document is silent on the purification of mixtures of mono- and bi-functional PFPEs and does not give any hint or suggestion to SFC separation.

There is therefore the need for an improved purification process for increasing the content of bifunctional PFPEs in mixtures of non functional, mono- and bifunctional PFPEs.

SUMMARY OF INVENTION

It has now been found that the content of bifunctional species in mixtures of non functional, mono- and bifunctional (per)fluoropolyethers can be advantageously increased by a purification process which comprises the use of an adsorbent stationary phase and a supercritical fluid as mobile phase, wherein a first desorption step is carried out with a supercritical fluid and a second desorption step is carried out with the supercritical fluid in admixture with a polar organic solvent.

Accordingly, the present invention relates to a process for increasing the content of bifunctional species in a mixture of non functional, mono- and bifunctional (per)fluoropolyethers which comprises, preferably consists of, the following steps:

(a) adsorbing a mixture of non functional, mono- and bifunctional (per)fluoropolyethers [mixture (M)] having a first average functionality (F1) onto an adsorbing stationary phase;

(b) desorbing mixture (M) with a supercritical fluid to recover a (per)fluoropolyether mixture (M') having a second average functionality (F2) lower than functionality (F1);

(c) desorbing the remaining mixture with the supercritical fluid in admixture with a polar solvent to recover a (per)fluoropolyether mixture [mixture (M")] having a third average functionality (F3) higher than functionality (F1).

Throughout the present description:
the expressions "content of bifunctional species", "content of bifunctional (per)fluoropolyethers", "bifunctional content" are equivalent;
the expression "mono- and bifunctional (per)fluoropolyether" denotes a fluoropolymer containing a fully or partially fluorinated polyalkyleneoxy chain having two chain ends, wherein one or both chain ends bear a functional group;
the expression "average functionality" refers to the average number of functional groups per polymer molecule in a PFPE mixture;
the acronym "PFPE" stands for a partially or fully fluorinated fluoropolyether as defined above;
the expression "purifying a PFPE mixture" means "increasing or enriching the content of bifunctional species" (or increasing or enriching the content of bifunctional PFPEs or bifunctional content or average functionality); likewise, the word "purification" means a process whereby the content of bifunctional species (or the content of bifunctional (per)fluoropolyethers or bifunctional content or average functionality) is increased or enriched.

Typically, the functional PFPE mixtures that can be submitted to the process of the present invention comply with formula (I) below:

$$X_1\text{—}O\text{—}R_f\text{—}Y \quad (I)$$

wherein:
$R_f$ is a (per)fluoropolyoxyalkylene chain having a number average molecular weight ranging from 500 to 10,000 and comprising repeating units selected from —$CF_2O$—, —$CF_2CF_2O$—, —$CF_2CF_2CF_2O$—, —$CF_2CF_2CF_2CF_2O$—, —$CF_2CF(CF_3)O$—, —$CF(CF_3)CF_2O$— and —$CR_4R_5CF_2CF_2O$—, wherein $R_4$ and $R_5$ are equal to or different from each other and are selected from H, Cl and fully or partially fluorinated alkyl [herein after (per)fluoroalkyl], preferably $C_1$-$C_4$(per)fluoroalkyl, said repeating units being statistically distributed along the chain;
$X_1$ is selected from: —$CFXCH_2O(CH_2CH_2O)_sH$, —$CFXC(O)R_h$, —$CFXC(O)OR_h$, —$CFXC(O)NR_h{}^I R_h{}^{II}$, —$CFXCH_2O(CH_2CH_2O)_sP(O)(OR_h{}^I)(OR_h{}^{II})$, in which s ranges from 0 to 20, X is F or $CF_3$, $R_h$, $R_h{}^I$ and $R_h{}^{II}$ are independently selected from H and a $C_1$-$C_{10}$ straight or branched alkyl group, Y is the same as $X_1$ or is selected from —$CF_3$, —$CF_2Cl$, —$CF_2CF_2Cl$, —$C_3F_6Cl$, —$CF_2Br$, —$CF_2CF_3$, —$CF_2H$, —$CF_2CF_2H$.

In a first preferred aspect, chain $R_f$ is a chain of formula:

   (Ia)

in which —$C_3F_6O$— can represent units of formulae —$CF(CF_3)CF_2O$— and —$CF_2CF(CF_3)O$—, X is as defined above, a is an integer equal to or higher than 1 and b is 0 or an integer equal to or higher than 1, selected in such a way that the number average molecular weight of chain $R_f$ is in the above-defined range and that, when b is other than 0, the a/b ratio ranges from 10 to 100.

In a second preferred aspect, chain $R_f$ is a chain of formula:

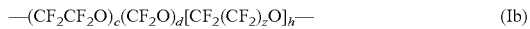   (Ib)

in which c is an integer equal to or higher than 1, d and h are 0 or integers equal to or higher than 1, c, d and h being selected in such a way that the number average molecular weight of chain $R_f$ is in the above range and that, when d is an integer equal to or higher than 1, the c/d ratio ranges from 0.1 to 10, the h/(c+d) ratio ranges from 0 to 0.05 and z is 2 or 3.

In greater detail, according to step (a) of the process of the invention, a mixture of non functional, mono- and bi-functional PFPEs [mixture (M)] having a first average functionality [functionality (F1)] is adsorbed onto an adsorbing stationary phase. Adsorbing stationary phases suitable for carrying out the process of the invention are compounds that contain sites or active groups able to provide polar bonds/interactions or hydrogen bonds with the end groups of the PFPEs in the mixture of formula (I). Usually, the stationary phase is selected from silica gels, Al and Mg silicates and active alumina, typically in the neutral form, silica gels being preferred. Among the various types of silica gel, 70-230 mesh, 60 Å and 100 Å silica gel, and 230-400 mesh, 60 Å silica gel can be mentioned in particular, while among the various types of alumina, 150 mesh, 58 Å alumina can be mentioned in particular. Suitable silica gels are available, for example, from W.R. Grace and Co., Clean Consult International S.p.A., Nova Chimica, Fluka, Merck Chemicals and Tirupati Ind., while suitable alumina are available from Tirupati Ind., Alcoa Inc. and Aughinish. Metal oxides, for example magnesium oxide, or metal hydroxides and $BaSO_4$ can also be used as stationary phases.

The stationary phase may be contained in a chromatographic column of a conventional supercritical fluid chromatography apparatus or in an extraction vessel of a conventional supercritical fluid extraction apparatus. Supercritical fluid extraction apparatuses are, for example, those marketed by Supercritical Fluid Technologies, Inc.

Typically, the ratio between PFPE mixture (M) (herein after also referred to as "starting mixture") and the adsorbing stationary phase ranges from 0.1 to 10 w/w, preferably from 0.1 to 2. Adsorption of PFPE mixture (M) onto the stationary phase can be accomplished either with the aid of an organic solvent or with the aid of the supercritical fluid to be used in the subsequent process steps. In the former case, PFPE mixture (M) is dissolved or suspended in a suitable organic solvent, then the adsorbing stationary phase is added to the resulting solution or suspension and the solvent is evaporated off. Examples of suitable organic solvents are partially fluorinated solvents like hexafluoroxylene and hydrofluoroethers, non-fluorinated solvents like alcohols, ketones and acetates, or mixture of partially fluorinated solvents and non-fluorinated solvents. The resulting adsorbing stationary phase with PFPE mixture (M) adsorbed onto it is then charged into the SFC column or SF extraction apparatus vessel. In the latter case, which is preferred, PFPE mixture (M) is charged into the SFC column or SF extraction apparatus vessel, then adsorption onto the stationary phase is accomplished by feeding into the column or vessel a supercritical fluid, keeping the column or vessel closed at constant supercritical temperature and pressure; the fluid can be selected from $CO_2$, a hydrocarbon, typically ethane or propane, and acetone, $CO_2$ being preferred. For example, in the case of supercritical $CO_2$ ($scCO_2$), the temperature typically ranges from 31.1 to 150° C., while the pressure ranges from 7.39 to 60 MPa. Fluid samples are withdrawn at regular times and the selected temperature and pressure conditions are maintained until the samples do not contain any PFPE mixture or until they contain a PFPE mixture having an average functionality lower than (F1)—0.05. Typically, with the above mixture (M) stationary phase ratio, step (a) lasts from 1 to 13 hours. The analysis of the PFPE mixture in the samples and the measurement of the difunctional content is typically carried out through $^{19}F$-NMR spectroscopy, as described in greater detail in the following experimental section.

Once absorption step (a) is complete, the first desorption step [step (b)] is carried out by increasing, gradually or in one step, the solvent power of the supercritical fluid, either by increasing the pressure at constant temperature, or by decreasing the temperature at constant pressure or both. The pressure can be increased until values that can be as high as 100 MPa, while the temperature can be decreased to values as low as the critical temperature of the supercritical fluid; in the case of $scCO_2$, the pressure can be increased to 60 MPa, while the temperature can be decreased to 31.1° C. Desorption is continued until complete recovery of a PFPE mixture (M') having a second average functionality (F2) lower than functionality (F1). Recovery of mixture (M') is considered complete when the mixture remaining on the stationary phase has the desired average functionality (F3) higher than (F1). A skilled person will be able to determine on a case-by-case basis the duration of step (b) by monitoring weight and the functionality (calculated through $^{19}F$-NMR analysis) of mixture (M') and by calculating the weight and average functionality of the mixture remaining on the stationary phase. For example, if 10 g of a starting PFPE mixture (M) having an average functionality (F1) of 1.900 and Mn=2000 are loaded onto the stationary phase and if the desired average functionality (F3) is 1.985, step (b) is considered complete when 5 g of a PFPE mixture (M') having an average functionality (F2) of 1.789 and Mn=2300 are collected.

Upon completion of desorption step (b), a further desorption step [step (c)] with the supercritical fluid in admixture with a polar solvent is carried out. For this purpose, a polar organic solvent, typically an alcohol, usually selected from methanol, ethanol, isopropanol and trifluoroethanol, is fed into the chromatographic column or extraction vessel in an amount of ranging from 0.5 to 10% w/w with respect to the supercritical fluid. According to a preferred embodiment, the preferred solvent is methanol, which is typically used in an amount of 5% w/w. The amount of polar organic solvent can be either maintained constant or can be gradually increased within the above indicated range. In this step, pressure and temperature can be the same as those of step (b) or they can be varied as described above in order to further increase the solvent power of the supercritical fluid. This further desorption step is continued until complete recovery of a mixture (M") having an average functionality (F3) higher than functionality (F1) is achieved.

The process of the present invention is particularly suitable for enriching the difunctional content of functional PFPE mixtures of formula (I) as defined above in which the $R_f$ chain complies with formula (Ia) or (Ib) as defined above; in particular, it is suitable for enriching the difunctional content of PFPE mixtures of formula (I) as defined above in which chain $R_f$ complies with the above formula (Ib), $X_1$ is selected from —$CFXCH_2O(CH_2CH_2O)_sH$, —$CFXC(O)OR_h$, —$CFXC(O)NR_h^I R_h^{II}$, in which s, X $R_h$, $R_h^I$, $R_h^{II}$ and Y is as defined above. Furthermore, the process of the invention is particularly effective in obtaining values of average functionality (F3) of at least 1.985.

The invention will be herein after illustrated in greater detail in the following experimental section and non-limiting examples.

Should the disclosure of any patents, patent applications, and publications which are incorporated herein by reference conflict with the description of the present application to the extent that it may render a term unclear, the present description shall take precedence.

Experimental Section
Materials and Methods
Starting PFPE Mixtures

Details concerning the composition of the starting PFPE mixtures are given below at the beginning of each example.

Equipment

A SFT-150 supercritical fluid extractor (SFE) available from Supercritical Fluid Technologies, Inc. was used; this extractor is equipped with a 300 ml fractionation vessel and of a heatable restrictor valve. The extractor was customised removing the standard stainless steel filter and inserting a gas pipe allowing the supercritical $CO_2$ to flow from the top to the bottom of the vessel; a gas exit connected to the restrictor valve was provided on top of the apparatus. Silica gel LC 60 Å 35-70 µm, available from Nova Chimica was placed in the vessel within a glass fiber container. Methanol used as co-solvent in step c) was fed through a co-solvent addition module, also available from SFT.

Characterisation

Molecular weight, composition and functionality of the PFPE mixtures of the following examples, all having a chain $R_f$ of formula (Ib) as defined above, were obtained by $^{19}F$-NMR spectroscopy using a Varian Mercury 300 spectrometer working at 282.176 MHz for the $^{19}F$ nucleus, equipped with an auto-switchable probe with Z-axis gradients.

The $^{19}F$-NMR spectra were obtained on pure samples with the acquisition parameters reported in Table 1 below:

TABLE 1

| | |
|---|---|
| Spectral Width | 70000 Hz |
| Flip Angle | 15° |
| Acquisition Time | 0.81 sec |
| Relaxation delay | 2 sec |
| Number of Scans | 1000 |

All chemical shift values are referred to the —$OCF_2CF_2CF_2CF_2O$ group=−128.82 ppm, determined in a separate experiment.

The following general procedure applies to PFPE mixtures of formula (I) in which chain $R_f$ complies with formula (Ib) and $X_1$ is a group of formula —$CFXCH_2O(CH_2CH_2O)_sH$, with s=0 and X=F; however, a similar procedure can be followed for calculating the functionality, composition and molecular weight of (per)fluoropolyoxyalkylenes of general formula (I) wherein $X_1$ is different from —$CFXCH_2O(CH_2CH_2O)_sH$ with s=0 and X=F and/or the (per)fluoropolyether chain $R_f$ is other than (Ib), on the basis of the respective chemical shift values.

The number average molecular weight Mn was calculated according to the following equation:

$$Mn = (2 \cdot M)/(F + I)$$

wherein $$M = 66 \cdot [A(I) + A(II) + A(III)] + 116 \cdot [A(IV) + A(V) - A(XVIII)]/2 +$$
$$166 \cdot A(IX) + 216 \cdot A(VIII)/2 + 77 \cdot [A(XIV) + A(XV)]/1.5 +$$
$$93.5 \cdot [A(XVI) + A(XVII)] + 143.5 \cdot [A(XVIII)] + 89 \cdot [A(X) + A(XI)] +$$
$$131 \cdot [A(XIX) + A(XX)] + 103 \cdot [A(XXI) + A(XXII)] +$$
$$59 \cdot [A(XXIII) + A(XXIV)] + 109 \cdot [A(XXV)]$$

$$F = A(X) + A(XI) + A(XIX) + A(XX) + A(XXI) + A(XXII)$$

$$I = A(XIV)/1.5 + A(XV)/1.5 + A(XVI) +$$
$$A(XVII) + A(XVIII) + A(XXIII) + A(XXIV) + A(XXV)$$

in which A(I) represents the integrated intensity of the signal corresponding to the "iesimo" assignment reported in Table 2 below.

The equivalent weight (EW) was calculated according to the following formula:

$$EW = M/F$$

wherein M and F have the meanings reported above.

End-groups XIV, XV, XVI, XVII, XVIII, XXIII, XXIV and XXV are not functional; since such groups were present at low concentration, the number of molecules having two non functional end-groups was considered negligible and was not taken into account in the above calculations.

The content of bifunctional species was calculated according to the following equation:

% of bifunctional species=$[(F-I)/(F+I)] \cdot 100$

The average hydroxyl functionality was calculated as follows:

$$f = 2 \cdot F/(F+I)$$

in which F and I are as defined above.

The composition of chain $R_f$ is expressed as $C_2F_4O/CF_2O$ ratio and was calculated as follows:

$C_2F_4O/CF_2O = [A(IV)+A(V)-A(XVIII)]/2 \cdot [A(I)+A(II)+A(III)]$ in which A(i) is as defined above.

TABLE 2

| Signal | Chemical shift (ppm) | Group |
|---|---|---|
| I | −52.1 | —OCF$_2$CF$_2$OCF$_2$CF$_2$O— |
| II | −53.7 | —OCF$_2$OCF$_2$$\overline{OCF_2}$CF$_2$O— |
| III | −55.4 | —OCF$_2$O$\overline{CF_2}$OCF$_2$O— |
| IV | −89.1 | —OCF$_2$$\overline{CF_2}$OCF$_2$CF$_2$O— |
| V | −90.7 | —OCF$_2$$\overline{CF_2}$OCF$_2$O— |
| VI | −83.8 | —OCF$_2$$\overline{CF_2}$OCF$_2$(CF$_2$)$_n$CF$_2$O— n = 1, 2 |
| VII | −85.4 | —OCF$_2$OCF$_2$$\overline{(CF_2)}_n$CF$_2$O— n = 1, 2 |
| VIII | −125.8 | —OCF$_2$$\overline{CF_2}$CF$_2$CF$_2$O— |
| IX | −129.7 | —OCF$_2$$\overline{CF_2}$CF$_2$O— |
| X | −81.3 | —OCF$_2$$\overline{CF_2}$OCF$_2$CH$_2$OH |
| XI | −83.3 | —OCF$_2$OCF$_2$$\overline{CH_2}$OH |
| XIV | −56.3 | —OCF$_2$OCF$_3$ |
| XV | −58.0 | —OCF$_2$$\overline{OCF_3}$ |
| XVI | −27.7 | —OCF$_2$$\overline{CF_2}$OCF$_2$Cl |
| XVII | −29.3 | —OCF$_2$OCF$_2$$\overline{Cl}$ |
| XVIII | −74.5 | —OCF$_2$$\overline{CF_2}$Cl |
| XXIII | −85.4 | —OCF$_2$$\overline{CF_2}$OCF$_2$H |

TABLE 2-continued

| Signal | Chemical shift (ppm) | Group |
|---|---|---|
| XXIV | −86.5 | —OCF$_2$OCF$_2$H |
| XXV | −138.5 | —OCF$_2$CF$_2$$\underline{H}$ |
| XIX | −78.2 | —OCF$_2$$\overline{CF_2}$OCF$_2$COOCH$_2$CH$_3$ |
| XX | −79.8 | —OCF$_2$OCF$_2$$\overline{C}$OOCH$_2$CH$_3$ |
| XXI | −78.5 | —OCF$_2$$\overline{CF_2}$OCF$_2$COOH |
| XXII | −80.3 | —OCF$_2$O$\underline{CF_2}$$\overline{C}$OOH |

EXAMPLES ACCORDING TO THE INVENTION

Example 1

Purification of a PFPE Diol Mixture

This example was carried out on a PFPE diol mixture of formula (I) in which $R_f$ complied with the above formula (Ib) wherein c/d=1, h=0; c, d, selected in such a way that the average molecular weight of the PFPE diol was 1049; $X_1$ was —CF$_2$CH$_2$OH and Y was —CF$_2$CH$_2$OH or a non functional end group selected from —CF$_3$, —CF$_2$Cl, —CF$_2$CF$_2$Cl, —C$_3$F$_6$Cl, —CF$_2$Br, —CF$_2$CF$_3$, —CF$_2$H and —CF$_2$CF$_2$H, in such a ratio that the average functionality was 1.958 (commercially available as a Fomblin® Z DOL PFPE).

Step (a): Adsorption of the PFPE Diol Mixture onto Silica Gel 39.0 g silica gel (SiO$_2$) and 19.5 g of the above-identified PFPE diol mixture (SiO$_2$/PFPE diol mixture weight ratio of 2/1) were introduced into the fractionation vessel of the above-indicated supercritical fluid extractor. The vessel was heated to 100° C., pressurized by feeding CO$_2$ at 15 MPa and maintained under these conditions until complete absorption onto the stationary phase (8 hours).

Step (b)—Desorption of a Low Functionality PFPE Diol with scCO$_2$

The fractionation vessel containing the adsorbed PFPE mixture was cooled to 80° C. and the pressure was increased to 20 MPa. By opening the heated (80° C.) restrictor valve and operating at a CO$_2$ flow rate of 1 Nl/min, 8.1 g PFPE diol (Mn=1224, f=1.882) was recovered in 3320 minutes (Mixture 1, see Table 3 below).

Step (c)—Desorption of Highly Functional PFPE Diol with scCO$_2$ in Admixture with Methanol After recovery of Mixture 1, the pressure was increased to 60 MPa, while the temperature was kept at 80° C. and desorption was carried out with 5% w/w methanol in scCO$_2$ in 400 min. After evaporation of both CO$_2$ and methanol, Mixture 2 (11.42 g, Mn=994, f=1.994) was recovered. Table 3 summarizes the process parameters and results.

The final yield expressed as the amount of PFPE diol having a functionality equal to or higher than that of the starting PFPE diol mixture (f=1.958) was therefore 58.5%.

TABLE 3

| | P (MPa) | Solvent | Collected Quantity (g) | Collected Quantity (%) | Functionality (f) | Mn* |
|---|---|---|---|---|---|---|
| Starting mixture | / | / | / | / | 1.958 | 1049 |
| Mixture 1 | 20 | scCO$_2$ | 8.1 | 41.5 | 1.882 | 1224 |
| Mixture 2 | 60 | scCO$_2$ + CH$_3$OH 5% w/w | 11.4 | 58.5 | 1.994 | 994 |

*Mn calculated from $^{19}$F-NMR data

Example 2

Purification of a PFPE Diol Mixture

The procedure described in Example 1 above was repeated with 15.1 g PFPE diol mixture and 29.6 g $SiO_2$ gel, with the difference that the first desorption step with $scCO_2$ only was carried out by increasing the pressure to about 60 MPa in one step, with a flow rate of 4 Nl/min, while the second desorption step with 5% w/w methanol in $scCO_2$ was carried out by decreasing the temperature to 60° C. and keeping the pressure at 60 MPa.

Upon completion of the first desorption step (1105 min), 10.0 g of a PFPE diol mixture with Mn=1267 and f=1.924 was recovered, while upon completion on the second desorption step (400 min) 5.1 g (33.7% yield) of a PFPE mixture with Mn=955 and f=1.998 was recovered (see table 4 below).

TABLE 4

| | P (MPa) | Solvent | Collected Quantity (g) | Collected Quantity (%) | Functionality (f) | Mn* |
|---|---|---|---|---|---|---|
| Precursor | / | / | / | / | 1.958 | 1049 |
| Mixture 1 | 60 | $scCO_2$ | 10.0 | 66.2 | 1.924 | 1267 |
| Mixture 2 | 60 | $scCO_2$ + $CH_3OH$ 5% w/w | 5.1 | 33.8 | 1.998 | 955 |

*Mn calculated from $^{19}$F-NMR data

Example 3

Purification of a PFPE Amide Mixture

This example was carried out with a PFPE amide mixture complying with formula (I) above, in which $R_f$ had formula (Ib), with c/d=1.83, h=0; c and d being selected in such a way that the average molecular weight of the PFPE amide was 1521; $X_1$ was —$CF_2C(O)NHCH_2CH_2CH_2CH_3$ and Y was —$CF_2C(O)NHCH_2CH_2CH_2CH_3$ or a non functional end-group selected from —$CF_3$, —$CF_2Cl$, —$CF_2CF_2Cl$, —$C_3F_6Cl$, —$CF_2Br$, —$CF_2CF_3$, —$CF_2H$ and —$CF_2CF_2H$, in such a ratio that the average functionality of the starting mixture was 1.852. This mixture was prepared according to known methods by reaction of commercially available Fluorolink® L 10/H PFPE with n-butilamine.

Step (a)—Adsorption of the PFPE Amide Mixture onto Silica Gel 29.8 g silica gel ($SiO_2$) and 14.9 g of the above-identified PFPE amide mixture were introduced in the vessel of the above-indicated supercritical fluid extractor, with a $SiO_2$/PFPE amide mixture ratio of 2/1 w/w. The vessel was heated to 100° C., pressurized by feeding $scCO_2$ at 15 MPa and maintained under these conditions until complete absorption onto the stationary phase (4 hours).

Step (b)—Desorption of Low Functional PFPE Amide with $scCO_2$

The fractionation vessel containing the adsorbed PFPE amide mixture was cooled to 60° C. and the pressure was increased to 60 MPa. By opening the heated (80° C.) restrictor valve and operating at a $CO_2$ flow rate of 2 Nl/min, 8.7 g PFPE amide (Mn=1449, f=1.747) was recovered in 2815 minutes (Mixture 1, see Table 4 below).

Step (c)—Desorption of Highly Functional PFPE Amide with $scCO_2$ in Admixture with Methanol After recovery of Mixture 1, maintaining the same pressure and temperature values, desorption was carried out with 5% (w/w) methanol in $scCO_2$ at a flow rate of 4 Nl/min. After evaporation of $scCO_2$ and methanol, Mixture 2 (6.2 g, Mn=1577, f=1.985) was recovered.

Table 4 summarizes the process parameters and the fractionation results.

The final yield, expressed as the amount of PFPE amide mixture having a functionality equal to or higher than 1.985, was 41.6%.

TABLE 4

| | P (MPa) | Solvent | Collected Quantity (g) | Collected Quantity (%) | Functionality (f) | Mn* |
|---|---|---|---|---|---|---|
| Starting mixture | / | / | / | / | 1.852 | 1521 |
| Mixture 1 | 60 | $scCO_2$ | 8.7 | 58.4 | 1.747 | 1449 |
| Mixture 2 | 60 | $scCO_2$ + $CH_3OH$ 5% w/w | 6.2 | 41.6 | 1.985 | 1577 |

*Mn calculated from $^{19}$F-NMR data

Example 4

Purification of a PFPE Ester Mixture

In this example a PFPE ester mixture of formula (I) in which $R_f$ complies with formula (Ib), wherein c/d=1.86, h=0; with c and d being selected in such a way that the average molecular weight of the PFPE ester is 1457; $X_1$ is —$CF_2C(O)OCH_2CH_3$ and Y is —$CF_2C(O)OCH_2CH_3$ or a non functional end-group selected from —$CF_3$, —$CF_2Cl$, —$CF_2CF_2Cl$, —$C_3F_6Cl$, —$CF_2Br$, —$CF_2CF_3$, —$CF_2H$ and —$CF_2CF_2H$, in such a ratio that the average functionality of is 1.874 (commercially available as Fluorolink® L 10/H) is used as starting PFPE mixture.

Step (a)—Adsorption of the PFPE Ester Mixture onto Silica Gel 45.0 g silica gel ($SiO_2$) and 7.5 g PFPE ester mixture are introduced in the fractionation vessel of the above-indicated supercritical fluid extractor, with a $SiO_2$/PFPE ester mixture ratio of 6/1 w/w. The vessel is heated to 100° C., pressurised by feeding $CO_2$ at 150 bar and maintained under these conditions until complete adsorption onto the stationary phase (2 hours).

Step (b)—Desorption of Low Functional PFPE Ester with $scCO_2$

The fractionation vessel is cooled to 60° C., increasing the pressure to 20 MPa. By opening the heated (80° C.) restrictor valve and operating at a flow rate of 2 Nl/min, 4.0 g PFPE ester mixture (Mn=1756, f=1.646) is recovered in 980 minutes (Mixture 1, see Table 5 below) is recovered.

Step (c)—Desorption of Highly Functional PFPE Ester with $scCO_2$ in Admixture with Methanol After recovery of Mixture 1, the pressure is increased to 60 MPa, while the temperature is maintained at 60° C.; desorption is carried out with 5% (w/w) methanol in $scCO_2$. After evaporation of $scCO_2$ and methanol, Mixture 2 (3.5 g, Mn=1214, f≥1.985).

Table 5 below summarizes the process parameters and the results of steps (b) and (c).

The final yield, calculated on the amount of PFPE ester having functionality equal to or higher than 1.985 is equal to 46.7%.

TABLE 5

|  | P (MPa) | Solvent | Collected Quantity (g) | Collected Quantity (%) | Functionality (f) | Mn* |
|---|---|---|---|---|---|---|
| Starting mixture | / | / | / | / | 1.874 | 1457 |
| Mixture 1 | 20 | scCO$_2$ | 4.0 | 53.3 | 1.646 | 1756 |
| Mixture 2 | 60 | scCO$_2$ | 3.5 | 46.7 | 1.985 | 1214 |

*Mn calculated from $^{19}$F-NMR data

COMPARATIVE EXAMPLES

All the following comparative examples were carried out on the same PFPE diol mixture as used in examples 1-2 above.

Comparative Example 1

Purification of a PFPE Diol Mixture by Desorption with scCO$_2$ Only (Step (b) According to the Present Invention)

21.5 g PFPE diol mixture were treated according to example 1, using 43.0 g SiO$_2$ gel (SiO$_2$ gel/PFPE diol mixture wt ratio of 2/1), with the difference that the desorption step with 5% wt methanol in scCO$_2$ was omitted.

After desorption with scCO$_2$ for 3300 min, 8.9 g of a PFPE diol with Mn=1230 and f=1.886 was recovered (Mixture 1; see Table 6 below).

TABLE 6

|  | P (MPa) | Solvent | Collected Quantity (g) | Collected Quantity (%) | Functionality (f) | Mn* |
|---|---|---|---|---|---|---|
| Starting mixture | / | / | / | / | 1.958 | 1049 |
| Mixture 1 | 20 | scCO$_2$ | 8.9 | 41.4 | 1.880 | 1230 |

*Mn calculated from $^{19}$F-NMR data

It stems from this example that by desorbing with scCO$_2$ only at a temperature of 80° C. and at a pressure of 20 MPa, the collected PFPE diol, representing 41.4% wt of the starting amount, has an average functionality lower than that of the starting PFPE diol mixture.

Comparative Example 2

Purification of a PFPE Diol Mixture by Desorption with scCO$_2$ Only (Step (b) According to the Present Invention)

7.7 g PFPE diol mixture was treated according to example 2, using 15.0 g SiO$_2$ gel (SiO$_2$ gel/PFPE diol mixture wt ratio of 2/1), with the difference that the desorption step with 5% (w/w) methanol in scCO$_2$ was omitted.

After desorption with scCO$_2$ for 1050 min, 5.0 g of a PFPE diol (Mixture 1 in Table 7 below) with Mn=1240 and f=1.922 were recovered (64.9% yield).

TABLE 7

|  | P (MPa) | Solvent | Collected Quantity (g) | Collected Quantity (%) | Functionality (f) | Mn* |
|---|---|---|---|---|---|---|
| Starting mixture | / | / | / | / | 1.958 | 1049 |
| Mixture 1 | 60 | scCO$_2$ | 5.0 | 64.9 | 1.922 | 1270 |

*Mn calculated from $^{19}$F-NMR data

It stems from this example that by desorbing with scCO$_2$ only at a pressure of 60 MPa, the amount of collected PFPE diol increases to 64.9% wt, but the average functionality remains lower than that of the starting PFPE mixture.

Comparative Example 3

Purification of a PFPE Diol Mixture by Desorption with a Mixture scCO$_2$ and Methanol Only [Step (c) According to the Present Invention]

6.0 g SiO$_2$ gel and 3.0 PFPE diol mixture (wt ratio of 2/1) were introduced in the vessel of the above-indicated supercritical fluid extractor. The vessel was heated to 100° C. and then pressured by feeding 5% wt methanol in scCO$_2$ at 15 MPa, maintaining these conditions for 13 hours. Sampling and $^{19}$F-NMR analysis of the eluate demonstrated that, in fact, no starting mixture was adsorbed onto the stationary phase; indeed, only a PFPE diol mixture (Mixture 1 in Table 8 below) was collected having the same weight, Mn and functionality as the starting one.

TABLE 8

|  | P (MPa) | Solvent | Collected Quantity (g) | Collected Quantity (%) | Functionality (f) | Mn* |
|---|---|---|---|---|---|---|
| Starting mixture | / | / | / | / | 1.958 | 1049 |
| Mixture 1 | 60 | scCO$_2$ + CH$_3$OH 1% w/w | 3 | 100 | 1.957 | 1045 |

*Mn calculated from $^{19}$F-NMR data

This comparative example demonstrates that it is not possible to increase the average functionality by carrying out only one desorption step with scCO$_2$ in admixture with a polar solvent, such as methanol, because absorption in the stationary phase does not occur.

The invention claimed is:

1. A process for increasing the content of bifunctional species in mixtures of non functional, mono- and bifunctional (per)fluoropolyethers which comprises the following steps:
    (a) adsorbing a mixture (M) of non functional, mono- and bifunctional (per)fluoropolyethers having a first average functionality (F1) onto an adsorbing stationary phase;
    (b) desorbing mixture (M) with a supercritical fluid to recover a (per)fluoropolyether mixture (M') having a second average functionality (F2) lower than functionality (F1);
    (c) desorbing the remaining mixture (M) with the supercritical fluid in admixture with a polar solvent to recover a (per)fluoropolyether mixture (M") having a third average functionality (F3) higher than functionality (F1).

2. A process according to claim 1, wherein mixture (M) complies with formula:

$$X_1\text{—O—}R_f\text{—Y} \quad (I)$$

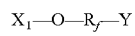

wherein:

R$_f$ is a (per)fluoropolyoxyalkylene chain having a number average molecular weight ranging from 500 to 10,000 and comprising repeating units selected from —CF$_2$O—, —CF$_2$CF$_2$O—, —CF$_2$CF$_2$CF$_2$O—, —CF$_2$CF$_2$CF$_2$CF$_2$O—, —CF$_2$CF(CF$_3$)O—, —CF(CF$_3$)CF$_2$O— and —CR$_4$R$_5$CF$_2$O— wherein R$_4$ and R$_5$ are equal to or different from each other and are selected from H, Cl and fully or partially fluorinated alkyl, said repeating units being statistically distributed along the chain;

X$_1$ is selected from: —CFXCH$_2$O(CH$_2$CH$_2$O)$_s$H, —CFXC(O)R$_h$, —CFXC(O)OR$_h$, —CFXC(O)NR$_h^I$R$_h^{II}$, —CFXCH$_2$O(CH$_2$CH$_2$O)$_s$P(O)(OR$_h^I$)(OR$_h^{II}$), in which s ranges from 0 to 20, X is F or CF$_3$, R$_h$, R$_h^I$ and R$_h^{II}$ are independently selected from H and a C$_1$-C$_{10}$ straight or branched alkyl group, Y is the same as X$_1$ or is selected from —CF$_3$, —CF$_2$Cl, —CF$_2$CF$_2$Cl, —C$_3$F$_6$Cl, —CF$_2$Br, —CF$_2$CF$_3$, —CF$_2$H, —CF$_2$CF$_2$H.

3. A process according to claim 2, wherein chain R$_f$ is selected from:

a chain of formula:

—(C$_3$F$_6$O)$_a$(CFXO)$_b$— (Ia)

wherein —C$_3$F$_6$O— represents units of formulae —CF(CF$_3$)CF$_2$O— and —CF$_2$CF(CF$_3$)O—, X is as defined above, a is an integer equal to or higher than 1 and b is 0 or an integer equal to or higher than 1, selected in such a way that the number average molecular weight of chain R$_f$ is in the above-defined range and that, when b is other than 0, the a/b ratio ranges from 10 to 100; and a chain of formula:

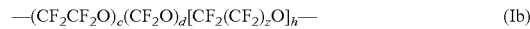
—(CF$_2$CF$_2$O)$_c$(CF$_2$O)$_d$[CF$_2$(CF$_2$)$_z$O]$_h$— (Ib)

in which c is an integer equal to or higher than 1, d and h are 0 or integers equal to or higher than 1, c, d and h being selected in such a way that the number average molecular weight of chain R$_f$ is in the above range and that, when d is an integer equal to or higher than 1, the c/d ratio ranges from 0.1 to 10, the h/(c+d) ratio ranges from 0 to 0.05 and z is 2 or 3.

4. A process according to claim 3, wherein chain R$_f$ is a chain of formula —(CF$_2$CF$_2$O)$_c$(CF$_2$O)$_d$[CF$_2$(CF$_2$)$_z$O]$_h$— (Ib), X$_1$ is selected from —CFXCH$_2$O(CH$_2$CH$_2$O)$_s$H, —CFXC(O)OR$_h$, and —CFXC(O)NR$_h^I$R$_h^{II}$.

5. A process according to claim 1, wherein functionality (F3) is at least 1.985.

6. A process according to claim 1, wherein the adsorbing stationary phase is selected from silica gels, aluminium and magnesium silicates, active alumina, metal oxides, metal hydroxides and barium sulphate.

7. A process according to claim 6, wherein the adsorbing stationary phase is a silica gel.

8. A process according to claim 1, wherein the supercritical fluid is selected from carbon dioxide, acetone and a hydrocarbon.

9. A process according to claim 8, wherein the supercritical fluid is carbon dioxide.

10. A process according to claim 1, wherein the polar solvent is an alcohol.

11. A process according to claim 10, wherein the polar solvent is selected from methanol, ethanol, propanol and trifluoroethanol.

12. A process according to claim 11, wherein the polar solvent is methanol.

\* \* \* \* \*